(12) United States Patent
Haller et al.

(10) Patent No.: US 6,957,045 B2
(45) Date of Patent: Oct. 18, 2005

(54) DEVICE, SYSTEM, COMPUTER READABLE MEDIUM AND METHOD FOR PROVIDING STATUS INFORMATION OF DEVICES IN A SHORT DISTANCE WIRELESS NETWORK

(75) Inventors: Amit Haller, Belmont, CA (US); Peter Fornell, Lake Oswego, OR (US); Avraham Itzchak, Ra'anana (IL); Ziv Haparnas, Tel Aviv (IL); Amir Glick, Tel Aviv (IL)

(73) Assignee: IXI Mobile (Israel) Ltd., Ra'anana (IL)

( * ) Notice: Subject to any disclaimer, the term of this patent is extended or adjusted under 35 U.S.C. 154(b) by 310 days.

(21) Appl. No.: 10/014,721

(22) Filed: Oct. 26, 2001

(65) Prior Publication Data

US 2003/0083011 A1 May 1, 2003

(51) Int. Cl.⁷ ................................................. H04B 5/00
(52) U.S. Cl. .................... 455/41.1; 455/67.11; 455/566
(58) Field of Search ................................ 455/41.1, 41.2, 455/41.3, 67.11, 67.12, 343.1, 343.3, 566, 575.1, 575.7, 556.2, 517

(56) References Cited

U.S. PATENT DOCUMENTS

| | | |
|---|---|---|
| 5,442,680 A | 8/1995 | Schellinger et al. |
| 5,457,737 A | 10/1995 | Wen |
| 5,572,528 A | 11/1996 | Shuen |
| 5,742,237 A * | 4/1998 | Bledsoe .................. 340/825.49 |
| 5,771,438 A | 6/1998 | Palermo et al. |
| 5,774,791 A | 6/1998 | Strohallen et al. |
| 5,793,763 A | 8/1998 | Mayes et al. |
| 5,805,166 A * | 9/1998 | Hall et al. ................... 345/839 |
| 5,838,252 A | 11/1998 | Kikinis |
| 5,896,369 A | 4/1999 | Warsta et al. |
| 5,929,848 A * | 7/1999 | Albukerk et al. .......... 455/41.1 |
| 5,978,386 A | 11/1999 | Hamalainen et al. |

(Continued)

FOREIGN PATENT DOCUMENTS

| | | |
|---|---|---|
| JP | 3153213 | 4/2001 |
| WO | WO 99/48315 | 9/1999 |

OTHER PUBLICATIONS

Karagiannis, "Mobility support for ubiquitous Internet access", ERICSSON Open report, pp. 1–70, Dec. 21, 2000.

Guthery et al., "The WebSIM—Clever Smartcards Listen to Port 80", version Dec. 15, 1999.

Project P946–GI, Smart Devices "When Things Start to Think", Jan. 2000, 2000 EURESCOM Participants in Project P946–GI.

(Continued)

*Primary Examiner*—Lana Le
(74) *Attorney, Agent, or Firm*—Vierra Magen Marcus Harmon & DeNiro LLP

(57) ABSTRACT

A device, a system, a computer readable medium and a method provide status information of a device and/or devices in a short distance wireless network in an embodiment of the present invention. Status information, such as the quality of the received signal and/or available battery power of each device in the short distance wireless network is provided to a device having a display according to an embodiment of the present invention. Status information may be selectively displayed in an easily viewable and preferable type in an embodiment of the present invention.

16 Claims, 9 Drawing Sheets

U.S. PATENT DOCUMENTS

| | | | |
|---|---|---|---|
| 5,987,011 A | | 11/1999 | Toh |
| 5,987,033 A | | 11/1999 | Boer et al. |
| 6,052,565 A | * | 4/2000 | Ishikura et al. .......... 455/67.11 |
| 6,064,734 A | | 5/2000 | Hasegawa et al. |
| 6,067,291 A | | 5/2000 | Kamerman et al. |
| 6,069,896 A | | 5/2000 | Borgstahl et al. |
| 6,078,789 A | | 6/2000 | Bodenmann et al. |
| 6,085,098 A | | 7/2000 | Moon et al. |
| 6,104,909 A | * | 8/2000 | Baldwin et al. .......... 455/67.7 |
| 6,130,602 A | | 10/2000 | O'Toole et al. |
| 6,151,628 A | | 11/2000 | Xu et al. |
| 6,218,958 B1 | | 4/2001 | Eichstaedt et al. |
| 6,223,029 B1 | | 4/2001 | Stenman et al. |
| 6,243,581 B1 | | 6/2001 | Jawanda |
| 6,265,788 B1 | | 7/2001 | Davidson et al. |
| 6,282,183 B1 | | 8/2001 | Harris et al. |
| 6,298,443 B1 | | 10/2001 | Colligan et al. |
| 6,326,926 B1 | | 12/2001 | Shoobridge et al. |
| 6,333,973 B1 | | 12/2001 | Smith et al. |
| 6,343,276 B1 | | 1/2002 | Barnett |
| 6,393,307 B1 | * | 5/2002 | Kim .......... 455/67.7 |
| 6,434,537 B1 | | 8/2002 | Grimes |
| 6,446,127 B1 | | 9/2002 | Schuster et al. |
| 6,452,910 B1 | | 9/2002 | Vij et al. |
| 6,459,882 B1 | | 10/2002 | Palermo et al. |
| 6,463,078 B1 | | 10/2002 | Engstrom et al. |
| 6,487,180 B1 | | 11/2002 | Borgstahl et al. |
| 6,490,465 B1 | * | 12/2002 | Mittelstadt et al. ......... 455/566 |
| 6,519,460 B1 | | 2/2003 | Haartsen |
| 6,532,366 B1 | | 3/2003 | Chung et al. |
| 6,600,428 B1 | * | 7/2003 | O'Toole et al. ........ 340/825.36 |
| 6,600,734 B1 | | 7/2003 | Gernert |
| 6,630,925 B1 | | 10/2003 | Östergård et al. |
| 6,633,759 B1 | | 10/2003 | Kobayashi |
| 6,636,489 B1 | | 10/2003 | Fingerhut |
| 6,654,616 B1 | | 11/2003 | Pope et al. |
| 6,665,549 B1 | | 12/2003 | Reed |
| 2002/0028698 A1 | * | 3/2002 | Linge .......... 455/566 |
| 2002/0037700 A1 | | 3/2002 | Dooley et al. |
| 2002/0055333 A1 | | 5/2002 | Davies et al. |
| 2002/0058502 A1 | | 5/2002 | Stanforth |
| 2002/0063472 A1 | * | 5/2002 | Irvin .......... 307/10.1 |
| 2002/0065817 A1 | | 5/2002 | Ito et al. |
| 2002/0068559 A1 | | 6/2002 | Sharma et al. |
| 2002/0068600 A1 | | 6/2002 | Chihara et al. |
| 2002/0069037 A1 | | 6/2002 | Hendrickson et al. |
| 2002/0082054 A1 | | 6/2002 | Keinonen et al. |
| 2002/0086642 A1 | * | 7/2002 | Ou et al. .......... 455/41.1 |
| 2002/0086718 A1 | | 7/2002 | Bigwood et al. |
| 2002/0091633 A1 | | 7/2002 | Proctor |
| 2002/0102974 A1 | | 8/2002 | Raith |
| 2002/0118663 A1 | | 8/2002 | Dorenborsch et al. |
| 2002/0128051 A1 | | 9/2002 | Liebenow |
| 2002/0142762 A1 | | 10/2002 | Chmaytelli et al. |
| 2002/0143952 A1 | | 10/2002 | Sugiarto et al. |
| 2002/0155830 A1 | | 10/2002 | Iyer |
| 2002/0160764 A1 | | 10/2002 | Gorsuch |
| 2003/0013438 A1 | | 1/2003 | Darby |
| 2003/0017810 A1 | | 1/2003 | Janninck et al. |
| 2003/0027563 A1 | | 2/2003 | Herle et al. |
| 2003/0032417 A1 | | 2/2003 | Minear et al. |
| 2003/0050058 A1 | | 3/2003 | Walsh et al. |
| 2003/0054765 A1 | * | 3/2003 | Botteck .......... 455/41 |
| 2003/0060188 A1 | | 3/2003 | Gidron |
| 2003/0060189 A1 | | 3/2003 | Minear et al. |
| 2003/0078036 A1 | | 4/2003 | Chang et al. |
| 2003/0091917 A1 | | 5/2003 | Davenport et al. |
| 2003/0114105 A1 | * | 6/2003 | Haller et al. .......... 455/41 |
| 2003/0115351 A1 | | 6/2003 | Giobbi |
| 2003/0122856 A1 | | 7/2003 | Hubbard |
| 2003/0153280 A1 | | 8/2003 | Kopp et al. |
| 2003/0187807 A1 | | 10/2003 | Matsubara et al. |
| 2003/0214940 A1 | | 11/2003 | Takken |
| 2003/0224773 A1 | | 12/2003 | Deeds |
| 2003/0232616 A1 | | 12/2003 | Gidron et al. |
| 2004/0001467 A1 | | 1/2004 | Cromer et al. |
| 2004/0048671 A1 | | 3/2004 | Rowe |

OTHER PUBLICATIONS

Yee et al., "Integrated Bluetooth With Wireless And Ricocheting", pp. 1310–1314, 2000 IEEE.

Haartsen, "BLUETOOTH—The universal radio interface for ad hoc wireless connectivity", pp. 110–117, Ericsson Review No. 3, 1998.

White Paper, Handheld Devices: Comparing the Major Platforms, www.dell.com/r&d, Dec. 2000.

Miyatsu, Bluetooth Design Background and Its Technological Features, IEICE Trans, Fundamentals, vol. E83-A, No. 11, Nov. 2000.

Parekh, Operating Systems on Wireless Handheld Devices, A Strategic Market Analysis, Massachusettes Institute of Technology, Sep. 28, 2000.

Johansson, et al., Short Range Radio Based Ad–hoc Netowrking: Performance and Properties, IEEE, 1999.

* cited by examiner

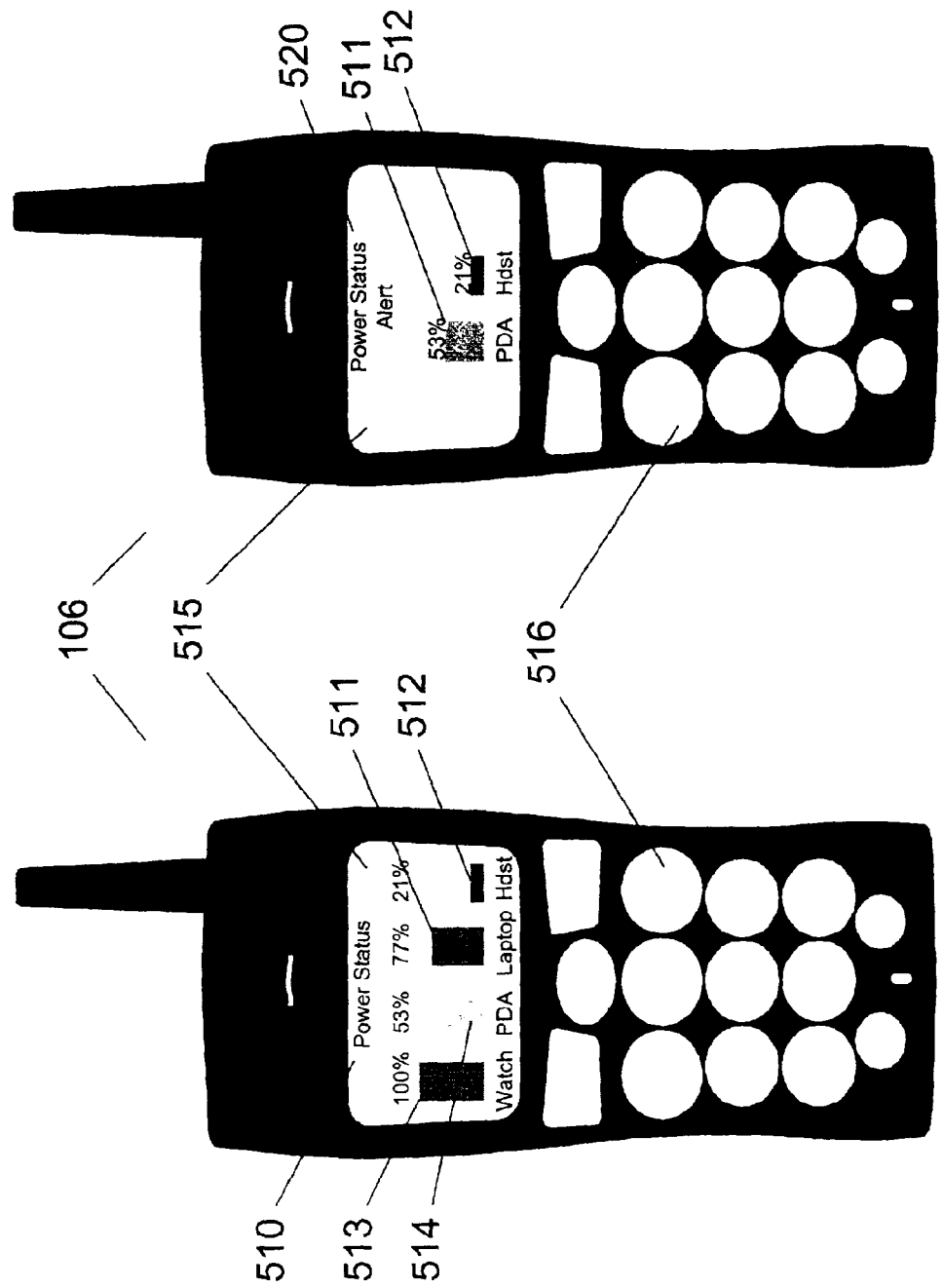

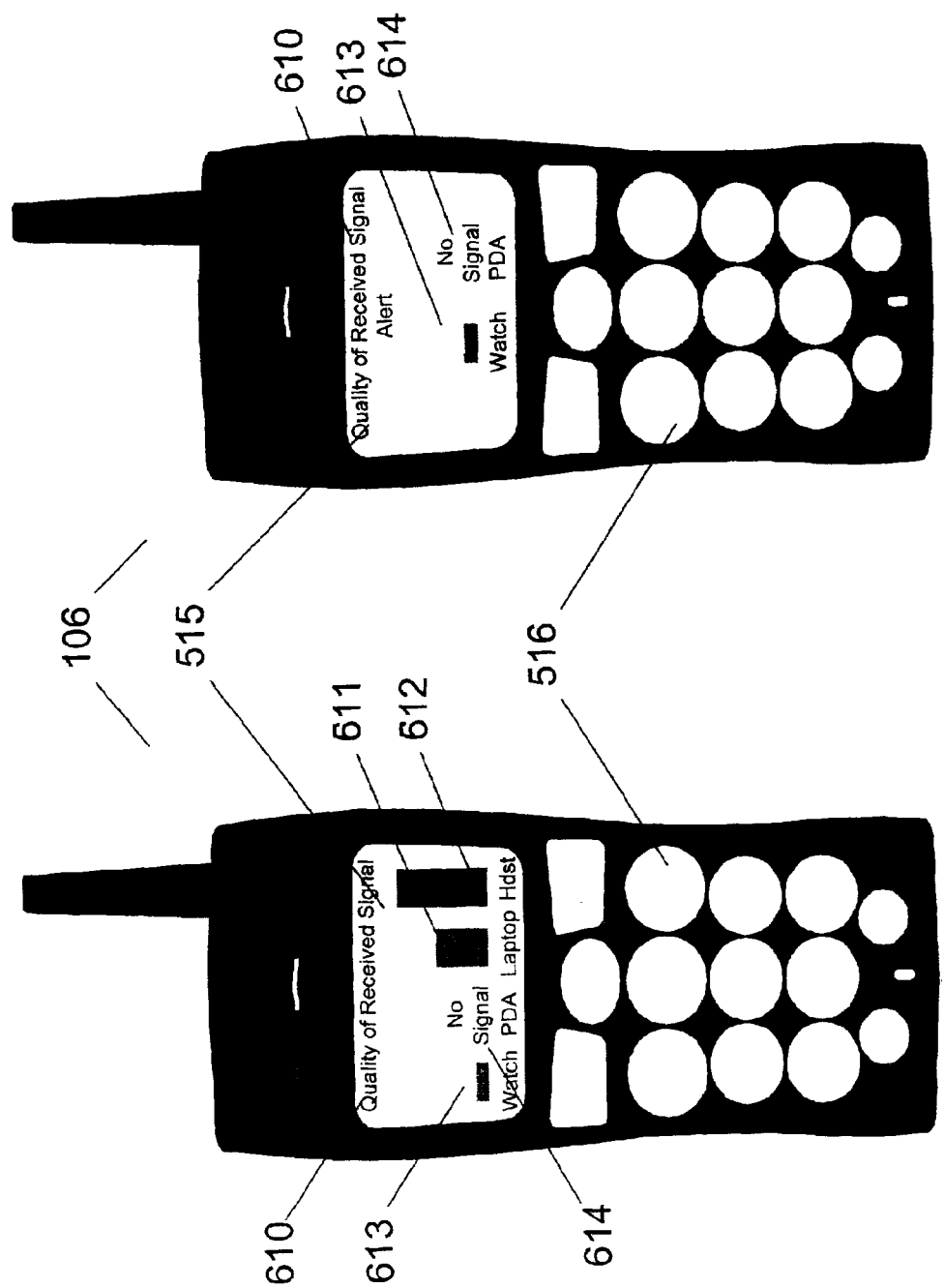

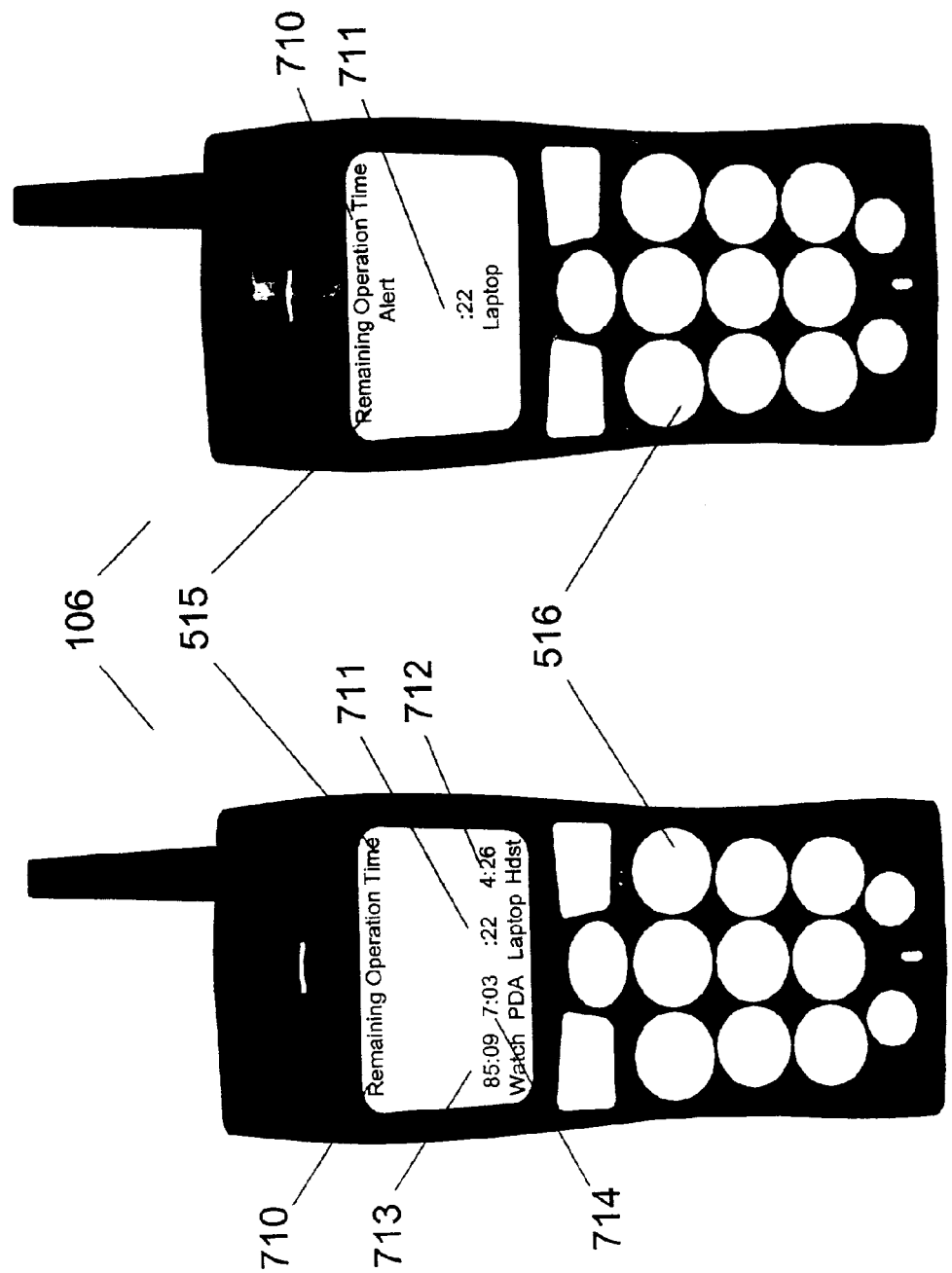

DEVICE, SYSTEM, COMPUTER READABLE MEDIUM AND METHOD FOR PROVIDING STATUS INFORMATION OF DEVICES IN A SHORT DISTANCE WIRELESS NETWORK

FIELD OF THE INVENTION

This invention relates generally to obtaining information in a network.

BACKGROUND OF THE INVENTION

Users are interested in obtaining status information on devices in a network, such as a wide area network ("WAN"), local area network ("LAN") or short distance wireless network.

A wireless communication device, such as a cellular telephone, is typically a node of a WAN or communication network. The cellular telephone may also be a part of a LAN or short distance wireless network for communicating with other user devices, such as a laptop, printer, Personal Digital Assistant ("PDA") and/or headset. For example, Bluetooth™ technology (www.Bluetooth.com) provides wireless communications between devices.

A user typically has difficulty obtaining status information regarding devices in a short distance wireless network.

First, each device in the short distance wireless network may not be able to provide visible status information to a user. For example, a headset typically does not have a display that can provide visual status information. If a user is moving out of the range of a short distance wireless network, a user cannot observe visually that signal reception by the headset will soon be reduced or lost until audio reception is distorted or dropped.

Second, a short distance wireless network may include a relatively large number of devices that have different types of status information. A user generally has to physically go to each device in order to assess its status. For example, if a printer is not printing out a desired file, a user would have to go to the location of the printer in order to determine if the printer is causing the problem (i.e. printer turned off, out of paper, lack of short distance wireless network signal reception) and the location of the device sending the print job. Moreover, devices may not easily or readily be available. For example, some devices may be in backpacks or in desks.

Third, a short distance wireless network device may provide status information, but not in a preferable type. A device may indicate remaining power from a battery, but not the amount of time remaining for operation.

Fourth, a short distance wireless network device may also not provide relevant status information in a timely manner and/or in an easily viewable format. A device may provide status information indicating the device has lost signal reception only after the signal has been dropped. Similarly, a user may not be interested in all status information and would like to select when and what status information is provided.

Fifth, while a short distance wireless network device may provide status information for itself, a user may be interested in status information for all devices, singularly or in various combinations, in the short distance wireless network. For example, a user may be interested in the combined remaining battery power of both a handset and a headset in a short distance wireless network having two or more devices.

Therefore, it is desirable to provide a device, system, computer readable medium and method that allow a user to obtain status information from a device in a short distance wireless network. It is further desirable to provide timely and preferable status information in an easily viewable format of selected devices in a short distance wireless network.

SUMMARY OF THE INVENTION

A processing device notifies a user of status information of a first device in a short distance wireless network responsive to a first short-range radio signal. The processing device comprises a storage device coupled to a processor. The storage device stores a first software component for notifying the user of status information of the first device.

According to an embodiment of the present invention, the processing device is a cellular telephone or a cellular modem.

According to an embodiment of the present invention, the first device is a cellular telephone or a cellular modem.

According to an embodiment of the present invention, the first device is selected from a group consisting of a desktop computer, a laptop computer, a personal digital assistant, a headset, a pager, a printer, a watch, a digital camera and equivalent.

According to an embodiment of the present invention, the processing device includes a short-range radio processor and a 2.4 GHZ transceiver or a 5.7 GHZ transceiver.

According to an embodiment of the present invention, the software component notifies a user of status information of a second device responsive to a second short-range radio signal.

According to an embodiment of the present invention, the processing device, the first device and the second device form a short distance wireless network.

According to an embodiment of the present invention, the processing device, the first device and the second device form an 802.11 network.

According to an embodiment of the present invention, the processing device, the first device and the second device form a Bluetooth™ network.

According to still another embodiment of the present invention, the status information regarding the first device includes an available battery power of the first device.

According to an embodiment of the present invention, the status information regarding the first device includes an available operating time of the first device.

According to an embodiment of the present invention, the status information regarding the first device includes a quality of received signal from the short distance wireless network.

According to an embodiment of the present invention, the status information regarding the first device includes a quality of received signal from a cellular network. In an embodiment of the present invention, the quality of the received signal is the signal strength and/or a bit error rate of the signal.

According to still another embodiment of the present invention, a cellular network, coupled to the processing device, generates a cellular protocol signal selected from the group consisting of Global System for Mobile Communications ("GSM") protocol, Code Division Multiple Access ("CDMA") protocol, CDMA 2000 protocol, Universal Mobile Telecommunications System ("UMTS") protocol, Time Division Multiple Access ("TDMA") protocol, General Packet Radio Service ("GPRS") or an equivalent.

According to an embodiment of the present invention, the status information is calculated by the processing device. The calculated status information includes a quality of received signal indication calculated from a bit error rate of the first device and/or signal strength of the first device.

According to an embodiment of the present invention, the status information includes a selected minimum battery status of the processing device and the first device.

According to an embodiment of the present invention, the storage device stores a second software component for polling the first device in order to obtain the status information.

According to an embodiment of the present invention, the first short-range radio signal includes status information generated on a periodic basis from the first device.

According to an embodiment of the present invention, the storage device stores a second software component for obtaining the status information of the first device responsive to a user selection.

According to an embodiment of the present invention, the first short-range radio signal includes status information generated from the first device in response to a first device event.

According to an embodiment of the present invention, the first device event includes the remaining power of the first device falling below a threshold value.

According to an embodiment of the present invention, the first device event includes a quality of the received signal of the first device falling below a threshold value.

According to an embodiment of the present invention, a system for providing status information in a short distance wireless network is provided. The system comprises a first device for generating a first short-range radio signal containing status information and a second device for receiving the short-range radio signal and notifying a user of the status information.

According to an embodiment of the present invention, the first device and the second device include a short-range radio processor and a short-range radio transceiver.

According to an embodiment of the present invention, the system further comprises a third device providing a second short-range radio signal containing status information. The second device receives the second short-range radio signal and notifies a user of the status information of the third device.

According to an embodiment of present invention, an article of manufacture including a computer readable medium for providing status information is provided. The article manufacture comprises a short-range radio software component for receiving a radio signal in a short distance wireless network. A notify software component notifies status information of a device in the short distance wireless network.

According to an embodiment of the present invention, a method for obtaining status information of devices in a short distance wireless network is provided. The method comprises the steps of obtaining user selected values: a user status information threshold value, a user status information type value and user status information notify preference value. Status information from devices in the short distance wireless network is obtained and provided to a user in response to the selected values.

Other aspects and advantages of the present invention can be seen upon review of the figures, the detailed description, and the claims that follow.

BRIEF DESCRIPTION OF THE FIGURES

FIGS. 5a–b illustrates providing status information, and in particular power status, of devices in a short distance wireless network according to an embodiment of the present invention.

FIGS. 6a–b illustrates providing status information, and in particular quality of received signal, of devices in a short distance wireless network according to an embodiment of the present invention FIGS. 7a–b illustrates providing status information, and in particular calculated remaining operating time, of devices in a short distance wireless network according to an embodiment of the present invention.

DETAILED DESCRIPTION

I. System Overview

The following description and claims relate to a device, a system, a computer readable medium and a method for providing status information of a device or devices in a short distance wireless network according to an embodiment of the present invention.

In an embodiment of the present invention, a short distance wireless network is a network of processing devices, such as a personal computer or wireless headset, that span a relatively small physical area, wherein at least one device generates and receives a short-range radio signal for communicating with another device in the network. In an embodiment of the present invention, the short-range radio signal can travel between approximately 0 and approximately 1000 feet. An example of a short distance wireless network includes a network of devices formed by Bluetooth™, HomeRF, 802.11 technologies, singly or in combinations, or an equivalent thereof. In an embodiment of the present invention, each processing device in a short distance wireless network has its own processing unit that executes a software component stored on the processing device memory, but also may access data and devices on the short distance wireless network. In an embodiment of the present invention, a wire, and in particular an Ethernet, provides communication between two or more processing devices in a short distance wireless network. In an alternate embodiment, electromagnetic signals provide wireless communication between one or more processing devices in a short distance wireless network. In still another embodiment, both wires and electromagnetic signals provide communication between processing devices in a short distance wireless network.

In an embodiment of the present invention, a WAN includes multiple LANs and/or short distance wireless networks connected over a relatively large distance. Telephone lines and electromagnetic signals, singly or in combination, couple the LANs and/or short distance wireless networks in a WAN. In an embodiment of the present invention, WAN 105 includes a cellular network generating and receiving cellular signals 111. In an embodiment of the present invention, a cellular network is defined as a communications system dividing a geographic region into sections, called cells. In an analog embodiment of the present invention, the purpose of this division is to make the most use out of a limited number of transmission frequencies. In an analog embodiment of the present invention, each connection, or for example conversation, requires its own dedicated frequency, and the total number of available frequencies is about 1,000. To support more than 1,000 simultaneous conversations, cellular systems allocate a set number of frequencies for each cell. Two cells can use the same frequency for different conversations so long as the cells are not adjacent to each other.

Figure 1:
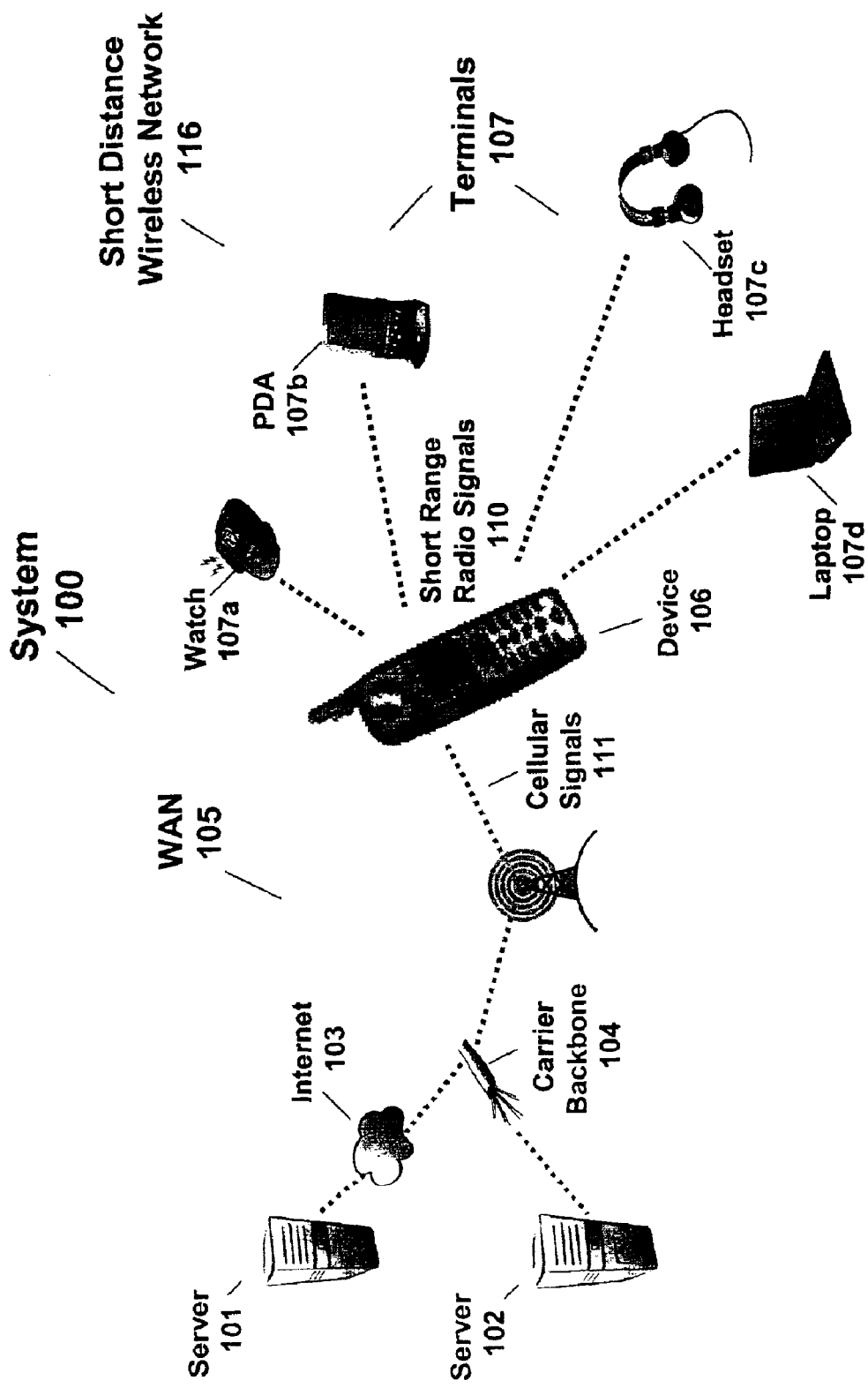
FIG. 1 illustrates a system according to an embodiment of the present invention.
Figure 3A:
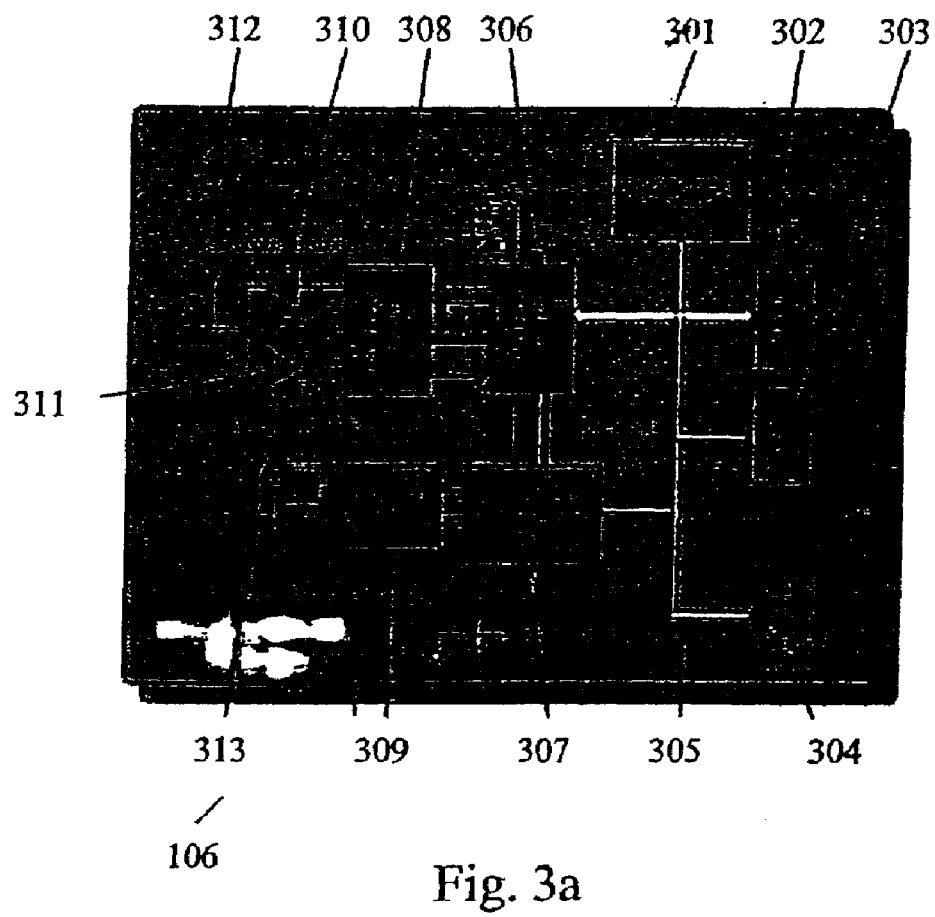
FIGS. 3a–b are hardware block diagrams of a device according to an embodiment of the present invention.
Figure 3B:
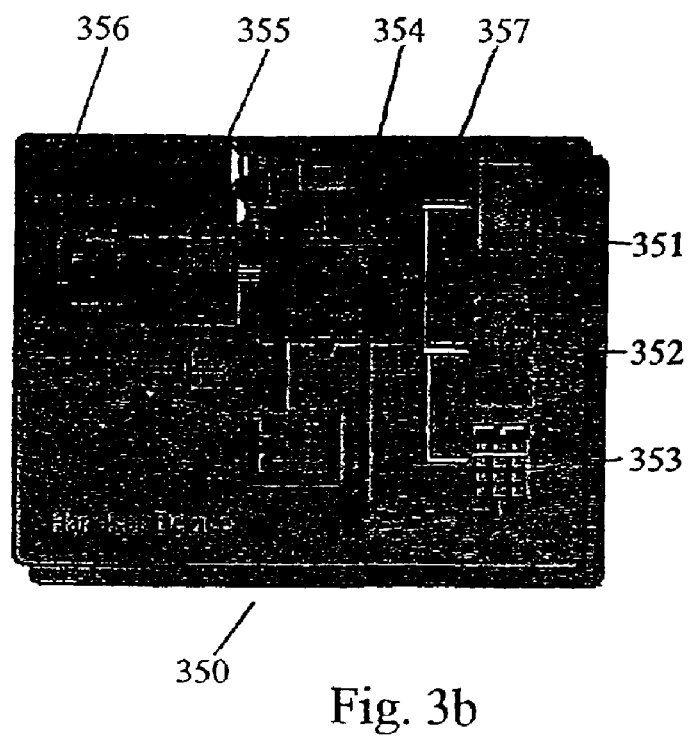

FIG. 1 illustrates system 100 according to an embodiment of the present invention. System 100 includes terminals 107 coupled to wireless device 106. In an embodiment of the present invention, device 106 and one or more terminals 107 communicate to form a short distance wireless network 116. In an embodiment of the present invention, terminals 107 are coupled to device 106 by short-range radio signals 110 to form short distance wireless network 116. In an embodiment of the present invention, some or all of terminals 107 may have wired connections. In an embodiment of the present invention, terminals 107 include watch 107*a*, PDA 107*b*, headset ("Hdst") 107*c* and laptop computer 107*d*. In an alternate embodiment, fewer or more terminals are used in short distance wireless network 116. In an alternate embodiment, terminals 107 include a desktop computer, a pager, a printer, a thin terminal, messaging terminal, a digital camera or an equivalent. In an embodiment of the present invention, terminals 107 include a Bluetooth™ 2.4 GHz transmitter/receiver. Likewise, device 106 includes a Bluetooth™ 2.4 GHZ transmitter/receiver. In an alternate embodiment of the present invention, a Bluetooth™ 5.7 GHZ transmitter/receiver is used. Hardware for device 106 and terminals 107 is illustrated in FIGS. 3*a*–*b* in an embodiment of the present invention.

In alternate embodiments of the present invention, other local wireless technologies, such as 802.11 or HomeRF signals, are used to communicate between device 106 and terminals 107.

In an embodiment of the present invention, WAN 105 is coupled to device 106. In an embodiment of the present invention, WAN 105 includes a cellular network transmitting and receiving cellular signals 111. In an embodiment of the present invention, cellular signals 111 are transmitted using a protocol, such as a Global System for Mobile communications ("GSM") protocol. In alternate embodiments, a Code Division Multiple Access ("CDMA"), CDMA 2000, Universal Mobile Telecommunications System ("UMTS"), Time Division Multiple Access ("TDMA"), General Packet Radio Service ("GPRS") protocol or an equivalent is used.

In an embodiment of the present invention, WAN 105 includes carrier backbone 104, server 101-102 and Internet 103. In an embodiment of the present invention, IP packets are transferred between the components illustrated in FIG. 1. In alternate embodiments of the present invention, other packet types are transferred between the components illustrated in FIG. 1.

In an embodiment of the present invention, a WAN 105 includes an IP public or private network, such as a corporate secured network using a Virtual Private Network ("VPN").

In an alternate embodiment of the present invention, device 106 is coupled to a WAN 105 by an Ethernet, Digital Subscriber Line ("DSL"), or cable modem connection, singly or in combination.

In an embodiment of the present invention, device 106 is a cellular handset or telephone. In an alternate embodiment of the present invention, device 106 is a cellular enabled PDA, wireless modem and/or wireless laptop computer.

In an embodiment of the present invention, WAN 105 is coupled to a wireless carrier internal network or carrier backbone 104. In an embodiment of the present invention, server 102 is coupled to carrier backbone 104. In an alternate embodiment of the present invention, carrier backbone 104 is coupled to Internet 103. Server 101 is coupled to Internet 103. In an embodiment of the present invention, servers 101 and 102 provide information, such as web pages or application software components, to terminals 107 by way of device 106. In an embodiment of the present invention, terminals 107 share services and communicate by way of device 106.

II. Hand-held Device/Terminal Hardware

Figure 2:
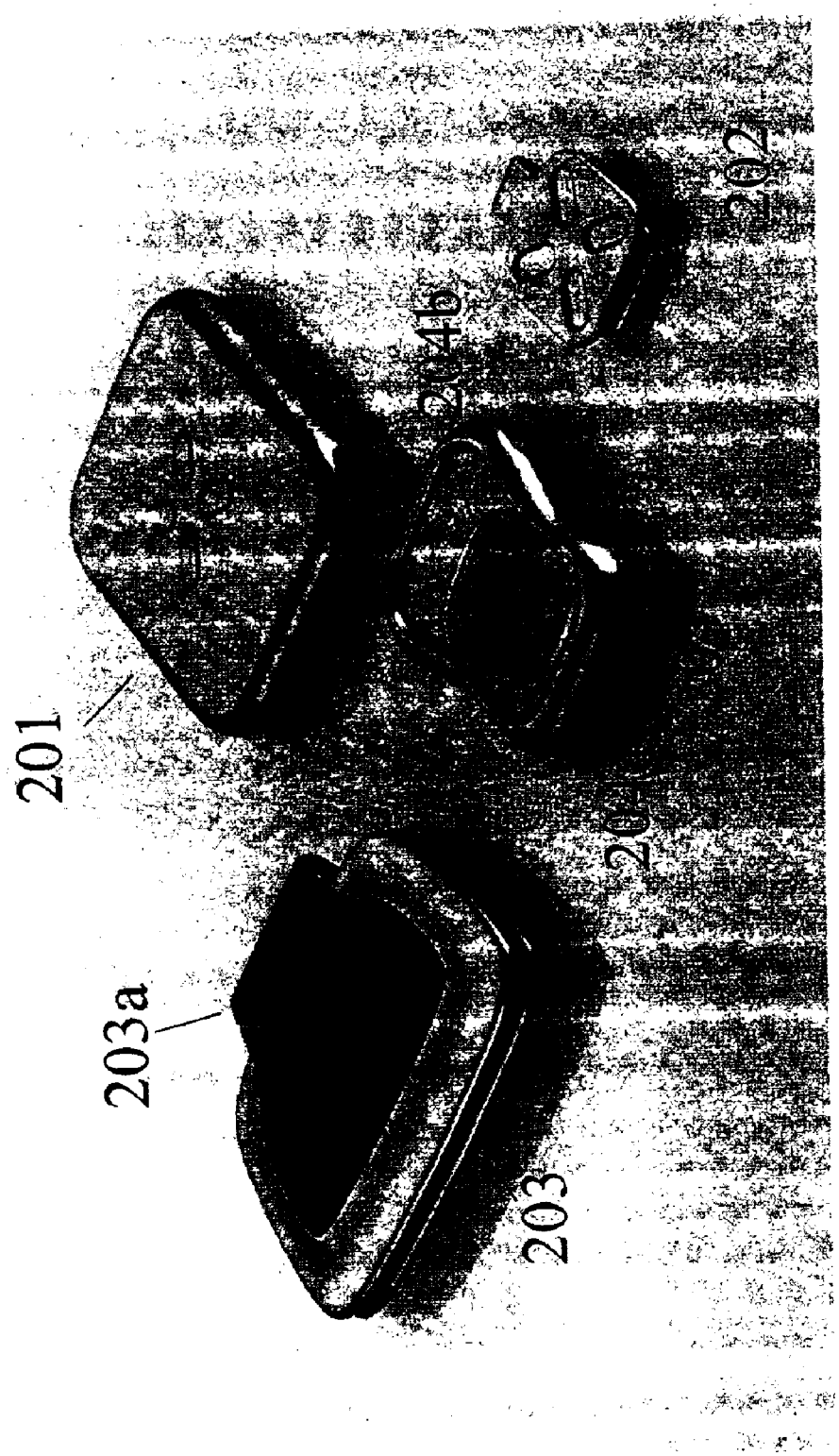
FIG. 2 illustrates thin terminals and a wireless device according to an embodiment of the present invention.

FIG. 2 illustrates embodiments of terminals 107 and device 106. In an embodiment of the present invention, there are two types of terminals: 1) smart terminals and 2) thin terminals. In an alternate embodiment of the present invention, smart terminals execute user logic and applications. Smart terminals have a relatively powerful processing unit, operating system and applications. Their main needs from a short distance wireless network 116 are access to a WAN 105 through TCP/IP and other network services such as storage and execution. For example, a laptop computer 107*d* and PDA 107*b* are smart terminals. Thin terminals have a relatively low power processing unit and operating system. They are mainly used as peripherals to an application server in a network and their main task is user interaction, rendering output for a user and providing an application server with a user's input. For example, a watch 107*a* or messaging terminals can be thin terminals.

FIG. 2 illustrates thin terminals and a cellular modem in an embodiment of the present invention. Voice terminal 204 includes a display 204*b* and a retractable keypad 204*a*. Messaging Terminal 203 is illustrated in a closed position with a hinge 203*a* used to open and close terminal 203. Terminal 203 also includes a miniature QWERTY keyboard and display when opened. In an embodiment of the present invention, device 201 is a cellular modem and includes a clip 202 for a belt.

FIG. 3*a* illustrates a hardware block diagram of device 106 in an embodiment of the present invention. Device 106 includes both internal and removable memory. In particular, device 106 includes internal FLASH (or Electrically Erasable Programmable Read-Only Memory ("EEPROM")) and static Random Access Memory ("SRAM") 302 and 303, respectively. Removable FLASH memory 304 is also used in an embodiment of the present invention. Memories 302, 303, and 304 are coupled to bus 305. In an embodiment of the present invention, bus 305 is an address and data bus. Application processor 301 is likewise coupled to bus 305. In an embodiment of the present invention, processor 301 is a 32-bit processor.

Bluetooth™ processor 307 is also coupled to bus 305. Bluetooth™ RF circuit 309 is coupled to Bluetooth™ processor 307 and antenna 313. Processor 307, RF circuit 309 and antenna 313 transceive and receive short-range radio signals to and from terminals 107, illustrated in FIG. 1, or device 350 illustrated in FIG. 3*b*.

Cellular, such as GSM, signals are transmitted and received using digital circuit 306, analog circuit 308, transmitter 310, receiver 311 and antenna 312. Digital circuit 306 is coupled to bus 305. In alternate embodiments, device 106 includes a display, a speaker, a microphone, a keypad and a touchscreen, singly or in combination.

FIG. 3b illustrates device 350 that is a hand-held device in an embodiment of the present invention. Device 350, in an embodiment of the present invention, is one of the terminals 107 illustrated in FIG. 1. Similar to device 106, device 350 includes SRAM and FLASH memory 351 and 352, respectively. Memories 351 and 352 are coupled to bus 357. In an embodiment of the present invention, bus 357 is an address and data bus. Keypad 353 is also coupled to bus 357. Short-range radio signals are transmitted and received using Bluetooth™ processor 354 and Bluetooth™ RF circuit 355. Antenna 356 is coupled to Bluetooth™ RF circuit 355. In an embodiment of the present invention, antenna 356 transmits and receives short-range radio signals. In alternate embodiments, device 350 includes a display, a speaker, a microphone, a keypad and a touchscreen, singly or in combination. As one of ordinary skill in the art would appreciate, other hardware components would be provided for device 350 in alternate embodiments of the present invention. For example in an embodiment in which device 350 is a laptop computer 107d, a disk drive and other input/output components are present.

III. Software

Figure 4:
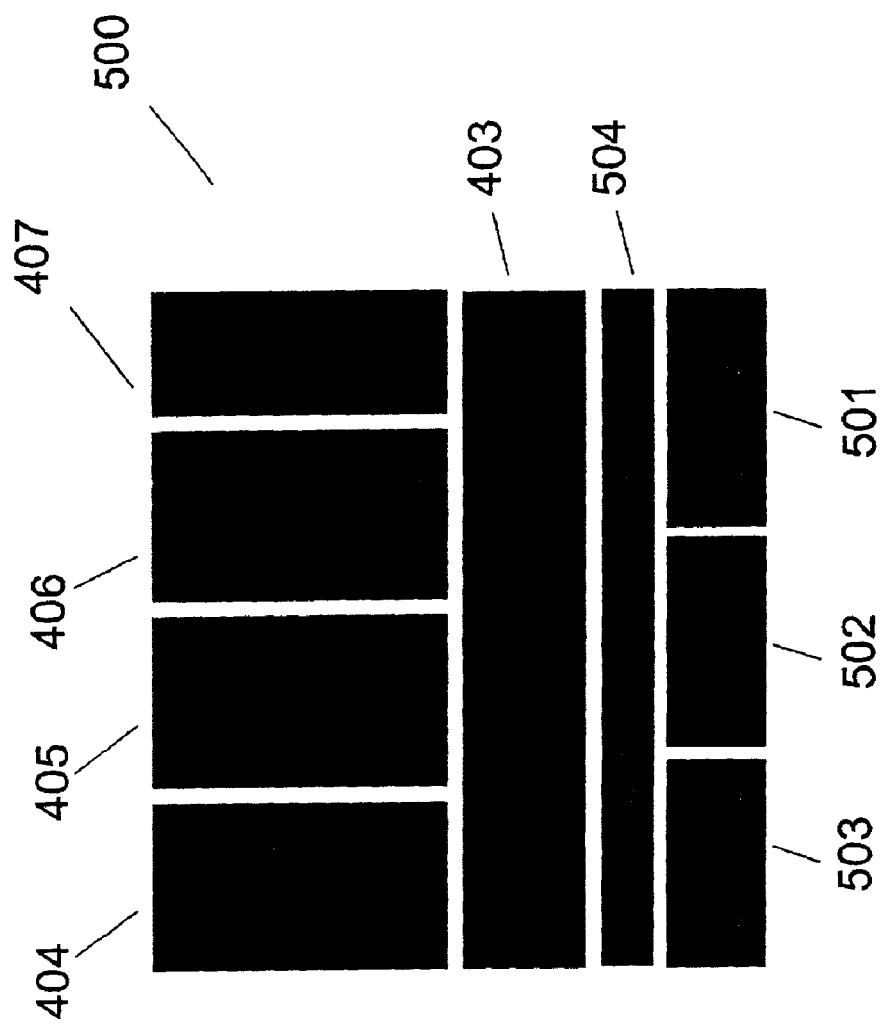
FIG. 4 is a software block diagram architecture for providing status information in a short distance wireless network according to an embodiment of the present invention.

FIG. 4 illustrates a software architecture 500 for device 106 illustrated in FIG. 3a according to an embodiment of the present invention. Software 500 is stored in FLASH memory 302. In an embodiment of the present invention, software components referenced in FIG. 4 represent a software program, a software object, a software function, a software subroutine, a software method, a software instance, and a code fragment, singly or in combination. In an alternate embodiment, functions performed by software components illustrated in FIG. 4 are carried out completely or partially by hardware.

In an embodiment of the present invention, software 500, or components of software 500, is stored in an article of manufacture, such as a computer readable medium. For example, software 500 is stored in a magnetic hard disk, an optical disk, a floppy disk, CD-ROM (Compact Disk Read-Only Memory), RAM (Random Access Memory), ROM (Read-Only Memory), FLASH, Electrically Erasable Programmable Read-Only Memory ("EEPROM"), or other readable or writeable data storage technologies, singly or in combination. In yet another embodiment, software 500, or components thereof, is downloaded from server 102 illustrated in FIG. 1.

Software 500 includes telecommunication software or physical layer protocol stacks, in particular cellular communications software 503 and short-range radio communications software 502. In an embodiment, communication software 503 is a GPRS baseband software component used with processor 306 to transmit and receive cellular signals. In an embodiment, communication software 502 is a Bluetooth™ baseband software component used with processor 307 to transmit and receive short-range radio signals. Other telecommunication software may be used as illustrated by other basebands 501.

In an embodiment of the present invention, operating system ("OS") 403 is used to communicate with telecommunications software 502 and 503. In an embodiment of the present invention, operating system 403 is a Linux operating system, EPOC operating system available from Symbian software of London, United Kingdom or a PocketPC or a Stinger operating system available from Microsoft® Corporation of Redmond, Wash. or Nucleus operating system, available from Accelerated Technology, Inc. of Mobile, Ala. Operating system 403 manages hardware and enables execution space for device software components.

Media abstraction layer 504 allows operating system 403 to communicate with basebands 503, 502 and 501, respectively. Media abstraction layer 504 and other abstraction layers, described herein, translate a particular communication protocol, such as GPRS, into a standard command set used by a device and/or terminal. The purpose of an abstraction layer is to isolate the physical stacks from the rest of the device software components. This enables future usage of different physical stacks without changing any of the upper layer software and allows the device software to work with any communication protocol.

Obtain status information software component 404, calculate status information software component 405 and notify status information software component 406 are used to provide status information of a terminal/device in a short distance wireless network according to an embodiment of the present invention. In an alternate embodiment of the present invention, software components 404, 405 and 406 are combined and/or partitioned into more software components.

In an embodiment of the present invention, obtain status information software component 404 obtains status information from each terminal 107 illustrated in FIG. 1. In an embodiment of the present invention, obtain status information software component 404 is executed on the hardware components of device 106 in order to generate and receive short-range radio signals containing the status information of each terminal in short distance wireless network 116. In an embodiment of the present invention, obtain status information 404, operating system 403 and Bluetooth™ Baseband software component 502 are used to generate and receive short-range radio signals 110 which contain status information. Status information includes, for example, available battery power of a particular terminal and/or a quality of the received signal of each terminal in an embodiment of the present invention. The quality of the received signal may be the quality of short-range radio signals 110 used for communicating in short distance wireless network 116 and/or the quality of cellular signals 111 received by device 106 from WAN 105. In alternate embodiments of the present invention, other status information is obtained. For example, status information may include a printer in short distance wireless network 116 completing a print job.

In an alternate embodiment, obtain status information 404 is stored in a terminal and obtains status information from device 116, such as quality of received signal (cellular signals 111).

Obtain status information software component 404 obtains status information from terminals 107 in various embodiments of the present invention.

In a first embodiment of the present invention, obtain status information software component 404 obtains status information by periodically polling terminals 107. Device 106 polls terminals 107, by using short-range radio signals 110, in order to obtain terminal status information. The period T or time between polling terminals 107 is selected based upon the type of requested status information. For example, if power status, which changes relatively infrequently, is polled, period T is relatively high, such as one minute. In contrast, if quality of received signal status is polled from terminals 107, period T is relatively low, such as one second.

In a second embodiment of the present invention, obtain status information software component 404 obtains status information by terminals 107 periodically pushing status information.

In a third embodiment of the present invention, obtain status information software component 404 obtains status information from terminals 107 in response to a user selection. For example, if a user pushes a power status button, software component 404 polls terminals 107 in order to obtain, and ultimately display, the power status of the selected terminal and/or terminals 107.

In a fourth embodiment of the present invention, obtain status information software component 404 obtains status information by terminals 107 generating status information in response to a terminal event. For example, if battery power of PDA 107b dropped below a 5% threshold, PDA 107b generates a short-range radio signal 110 containing PDA 107b power status information.

Calculate status information software component 405 calculates status information responsive to a status information type value and status information from terminals 107 in an embodiment of the present invention. For example, calculate status information software component 405 calculates the remaining operating time of a terminal responsive to remaining power status information received from the terminal when a user selects a status information type value "operating time." Similarly, calculate status information software component 406 generates alert status information in response to a comparison between status information received from a terminal and a selected threshold value in an embodiment of the present invention.

Notify status information software component 406 notifies, and in an embodiment displays, status information in response to a notify preference value. For example, status information for all terminals 107 is displayed on display 515 in response to a user selecting an "all" notify preference value.

In an embodiment of the present invention, notify status information component 406 notifies a user of the status of each selected device in network 116.

In an alternate embodiment of the present invention, notify status information component 406 notifies a user of the status of a selected set of devices in network 116.

In still another embodiment of the present invention, notify status information component 406 notifies a user of the combined status of a selected set of devices in network 116, for example, the combined operating time of PDA 107b and device 106.

In an alternate embodiment, device 106 stores and executes obtain status information 404 and calculate status information. The status information is then transferred to a thin terminal that stores and executes notify status information 406 in providing the status information from a terminal, such as a thin terminal.

In an alternate embodiment, any terminal in terminals 107 stores and executes obtain status information software component 404, calculate status software component 405 and notify software component 406.

In an alternate embodiment of the present invention, notify status information software component 406, stored and executed in device 106, provides a bit map containing status information to a terminal in terminals 107.

Furthermore, Graphics User Interface ("GUI") 407 is provided to allow a user-friendly interface.

FIGS. 5a–b, 6a–b and 7a–b illustrate notifying a user of status information of various terminals in short distance wireless network 116 shown in FIG. 1. In an embodiment of the present invention, device 106 is a cellular telephone having a display 515 and keypad 516. In an embodiment of the present invention, a user is notified of status information by providing graphic elements and text to display 515. The type of status information is communicated to a user by label 510, such as "Power Status", shown in FIG. 5a. In an embodiment of the present invention, the status information is provided by color coded graphical elements. For example, FIG. 5a illustrates notifying a user of "Power Status" information of the terminals in short distance wireless network 116. In this embodiment of the present invention, color coded bars with respective percentages of remaining power in the terminals is displayed. A full green bar 513 with a label of "100%" notifies a user that Watch 107a is approximately fully charged. A half yellow bar 514 with a label of "53%" notifies a user that PDA 107b has a battery that is approximately half charged. A three-quarters green bar 511 with a label of "77%" notifies a user that laptop 107d has a battery that is approximately three-quarters charged. A quarter red bar 512 with a label of "21%" notifies a user that headset 107c has a battery that is approximately one-quarter charged. In an embodiment of the present invention, a green bar indicates that a particular terminal has sufficient power. In an embodiment of the present invention, a yellow bar indicates that a terminal has a battery that may need to be replaced or recharged soon and a red bar indicates that the battery of a terminal needs to be replaced immediately. The color coded bars allow a user to easily view which terminals need their batteries recharged or replaced.

In an alternate embodiment, color coded Light Emitting Diodes (LEDs) are positioned on device 106 and/or terminals 107 to likewise notify a user of status information.

FIG. 5b illustrates selectively displaying status information. For example, yellow bar 511 and red bar 512 are selectively displayed to represent the power status of PDA 107b and headset 107c, respectively. Selectively displaying status information allows for more available display 515 space for providing other information to a user. Furthermore, selectively displaying status information when user intervention is or will be needed allows for efficient and effective maintenance of short distance wireless network 116. A user does not have to be concerned with changing or checking batteries until a power status alert is generated.

In an embodiment of the present invention, alert status information is displayed in FIG. 5b. Alert status information is generated in response to a terminal event or status information falling below a status information threshold value. For example, if a battery of PDA 107b falls below a threshold value of "60%", a power status alert signal in the form of yellow bar 511 is displayed on display 515. In an embodiment of the present invention, an alert signal is transmitted in short-range radio signals 110 by terminals 107 to device 106. In an alternate embodiment of the present invention, status information is transmitted to device 106 by short-range radio signals and device 106 compares the status information with a stored threshold value in generating an alert on display 515.

FIGS. 6a–b illustrate displaying status information, and in particular quality of a terminal received signal identified as "Quality of Received Signal" label 610. FIGS. 6a–b, like FIGS. 5a–b, illustrate displaying the quality of received signal of the respective terminals in short distance wireless network 116. Color coded bars 611–613 and "No Signal" text 114 notify a user of the signal reception of respective terminals in short distance wireless network 116. Thus, a user is able to identify the optimal physical orientation of the terminals for maximum signal reception. Further, a user can determine if a terminal will lose communication with short distance wireless network 116 if the terminal is repositioned or moved farther away from short distance wireless network 116 before actual reception is degraded or lost.

FIGS. 7a–b illustrate displaying calculated status information, and in particular remaining operating time of respective terminals identified as "Remaining Operation Time" label 710. In alternate embodiments of the present invention, remaining talk time and/or standby time is provided. FIGS. 7a–b, like FIGS. 5a–b and 6a–b, illustrate displaying the remaining operating time of the respective terminals in short distance wireless network 116. Remaining operating time 711–714 notify a user of the remaining operating time of respective terminals in short distance wireless network 116. For example, laptop 107d has 22 minutes of remaining operating time. Thus, a user is able to replace the laptop battery or connect laptop 107d to a power source before valuable electronic files are lost when the laptop battery is no longer able to provide sufficient power.

Figure 8A:
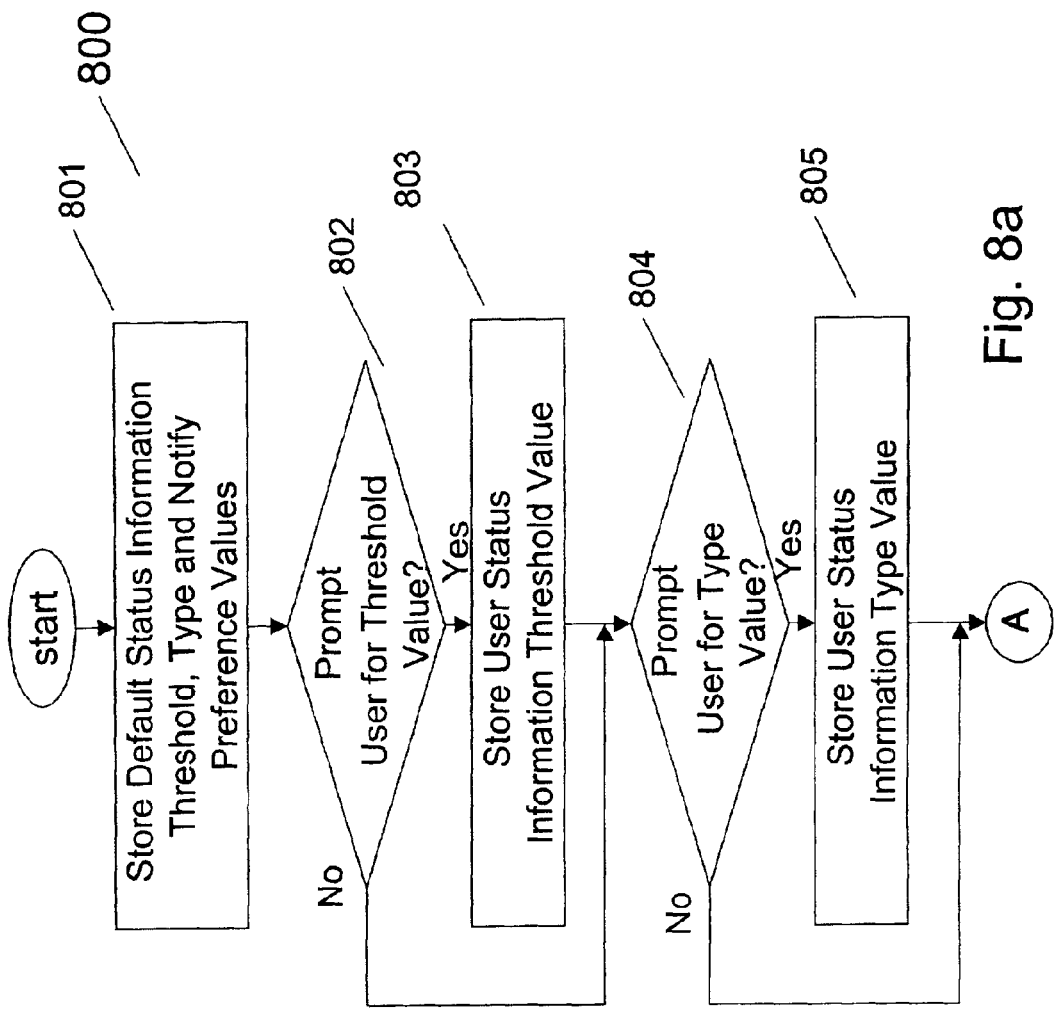
FIGS. 8a–b are flowcharts illustrating providing status information of devices in a short distance wireless network according to an embodiment of the present invention.
Figure 8B:
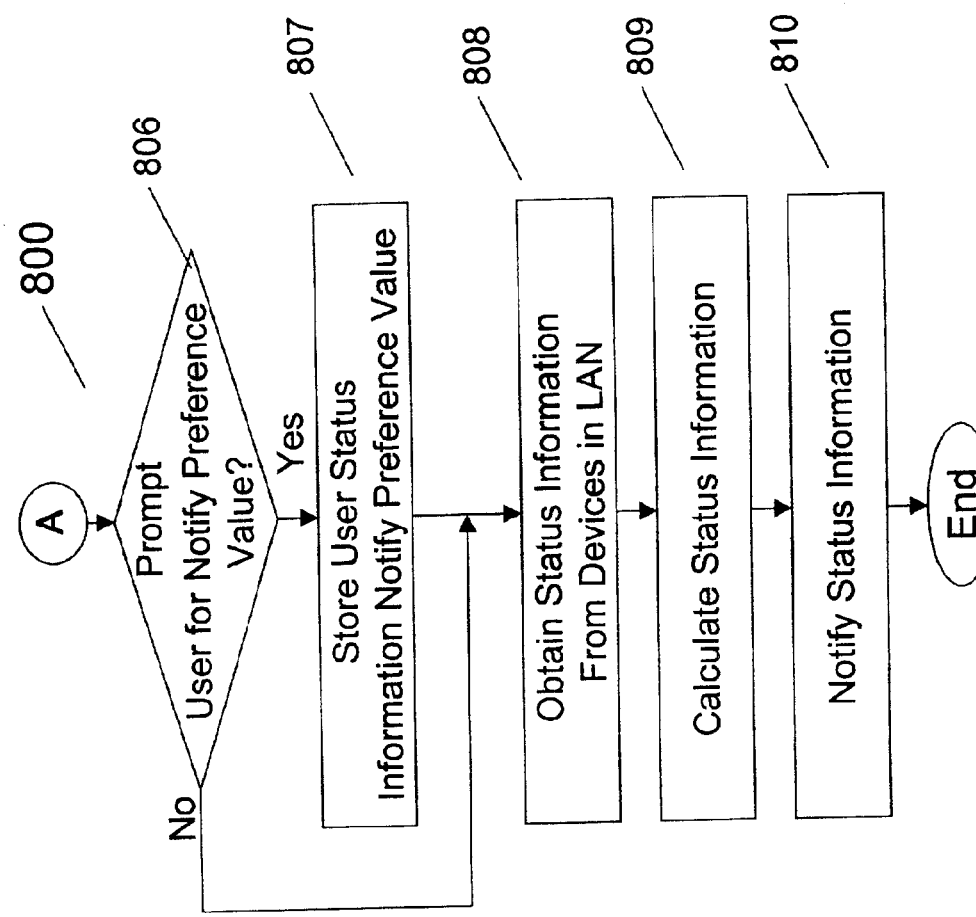

FIGS. 8a–b illustrate a method 800 for obtaining status information in a short distance wireless network 116 according to an embodiment of the present invention. In an embodiment, method 800 is performed by obtain status information software component 404, calculate status information software component 405 and notify status information software component 406 illustrated in FIG. 4. In an embodiment of the present invention, a logic box or step illustrated in FIGS. 8a–b may represent an execution of a software component, such as a software program, a software object, a software function, a software subroutine, a software method, a software instance, a code fragment, singly or in combination. In an alternate embodiment of the present invention, a logic box or step represents execution of a software component, hardware operation or user operation, singly or in combination. In an alternate embodiment of the present invention, fewer or more logic boxes or step are carried out in method 800.

As illustrated in FIGS. 8a–b, default status information threshold, type and notify preference values are stored as illustrated by logic block 801. Server 102 illustrated in FIG. 1 downloads these values in an embodiment of the present invention. In an alternate embodiment of the present invention, these values are stored in device 106 by a manufacturer and/or a reseller. In an embodiment of the present invention, default status information threshold, type and notify preference values are stored in persistent storage, such as FLASH 302 illustrated in FIG. 3a.

A status information threshold value is a predetermined value used to determine when status information will be provided to a user (assuming the status information has been selected to be notified by a notify preference value described below). For example, a user, reseller and/or manufacturer of device 106 can store a battery power threshold value of "60%" which will be used by calculate status information software component 405 in deciding whether to provide battery power status information of a terminal in short distance wireless network 116 to a user. Short distance wireless network 116 may include numerous terminals. All the terminals' power status may not easily be shown on a relatively small display 515. Further, a user may only be interested in terminals that may require imminent recharging or battery replacement. For example, FIG. 5b illustrates the power status information of PDA 107a and Hdst 107c when a threshold value of "60%" is used. Terminals with adequate power availability, such as Watch 107a and Laptop 107d, are not shown to the user. Thus, a user is not bothered with unnecessary information and display 515 has available screen space for providing a user with other information.

A status information type value is a predetermined value used to determine what type of status information will be provided to a user. For example, a user may be interested in knowing the available operating time of a laptop 107d in short distance wireless network 116 and not necessarily the amount of available power of laptop 107d. However, laptop 107d may only provide the remaining battery power of laptop 107d to device 106 by way of short-range radio signals 110. In an embodiment of the present invention, a manufacturer, reseller or user of device 106 can store a status information type value. Calculate status information software component 405 calculates status information responsive to a status information type value. For example, calculate status information software component 405 calculates the available operating time of laptop 107d responsive to an "operating time" status information type value and battery power status information received by short-range radio signals 110 from laptop 107d. In an embodiment of the present invention, laptop 107d's remaining operating time is calculated by averaging the available battery power status information obtained from laptop 107d. The average samples then may be extrapolated to obtain a remaining operating time for laptop 107d. Likewise, a quality of received signal can be calculated responsive to a "signal strength" status information type value and a signal strength status information provided by a terminal in short distance wireless network 116. In an alternate embodiment of the present invention, a quality of received signal can be calculated by obtaining the bit error rate of the received signal of a terminal or a combination of strength of the received signal and bit error rate of the received signal.

A status information notify preference value is a predetermined value used to determine what status information is provided to a user. For example, a user, reseller and/or manufacturer of device 106 can store an "all" value which will be used by notify status information software component 406 in notifying status information of all terminals in short distance wireless network 116 to a user. However, a short distance wireless network 116 may include numerous terminals and a user may be interested in only showing status information of certain terminals. For example, a user may only want to view particular status information of a particular terminal, such as quality of signal of headset 107c. Accordingly, a user would set a "Hdst/signal strength" status information notify preference value so that only the quality of signal of headset 107c is displayed in an embodiment of the present invention.

In an alternate embodiment of the present invention, notify status information software component 406 notifies a user of status information by an audio alert or vibration of device 106. In an alternate embodiment of the present invention, notify status information software component 406 notifies a user by vibrating one or more terminals 107. In still an alternate embodiment of the present invention, status information software component 406 notifies a user by generating an email or message.

Returning to FIG. 8a, in an embodiment of the present invention, a determination is made in logic block 802 as to prompt a user for a status information threshold value. The prompt may be presented on display 515 in an embodiment of the present invention. Multiple threshold values are entered in an embodiment of the present invention. If a user inputs affirmatively, a status information threshold value is stored and overrides a default threshold value in logic block 803.

Logic blocks 803, 804, 806 and 807, similarly prompt and override status information type and notify preference values in an embodiment of the present invention.

Status information from terminals 107 is obtained as illustrated by logic block 808 in an embodiment of the present invention.

Likewise, status information is calculated as illustrated by logic block 809 in an embodiment of the present invention.

And, status information is notified to a user in an embodiment of the present invention as illustrated by logic block 810 and method 800 ends.

IV. Conclusion

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system for providing status information in a short distance wireless network, comprising:
   a first moveable device to generate a first short-range radio frequency signal containing status information of the first device;
   a second moveable device including:
      a display,
      a storage device,
      a processor, coupled to the storage device,
   wherein the storage device stores a first software component to notify a status information of the first moveable device on the display in response to the first short range radio signal,
   wherein the status information of the first moveable device is calculated and includes a received signal indication calculated from a bit error rate of a short-range radio signal transferred between the first and second moveable devices;
   wherein the first and second moveable devices may be positioned by a user; and
   a third moveable device to generate a second short-range radio frequency signal containing a status information of the third moveable device, and wherein the second moveable device receives the second short-range radio frequency signal and notifies the status information of the third moveable device, wherein the second device displays the status information of the first moveable device and the status information of the third moveable device, concurrently, so that the user is able to identify a physical orientation of the first, second and third moveable devices for maximum signal reception.

2. The system of claim 1, wherein the first, second and third moveable devices form a short distance wireless network coupled to the Internet, and wherein the status information of the first moveable device and the status information of the third moveable device is selectively displayed on the second moveable device responsive to a notify preference value selected by the user.

3. The system of claim 1, wherein the status information of the first moveable device further includes a remaining power in the first moveable device.

4. The system of claim 1, wherein the status information of the first moveable device further includes a quality of a received signal of the first moveable device.

5. The system of claim 1, wherein the status information of the first moveable device further includes calculated status information by the first moveable device.

6. The system of claim 1, wherein the status information of the first moveable device further includes a minimum battery status from the first moveable device selected by the user.

7. The system of claim 1, wherein the second moveable device includes a software component for polling the first moveable device in order to obtain the status information of the first moveable device.

8. The system of claim 1, wherein the first short-range radio frequency signal is generated on a periodic basis from the first moveable device.

9. The system of claim 1, wherein second moveable device obtains the status information of the first moveable device responsive to a user selection.

10. The system of claim 1, wherein the status information of the first moveable device is displayed in response to a first moveable device event and a status information threshold value selected by the user, wherein the status information threshold value indicates when the status information is displayed.

11. The system of claim 10, wherein the first moveable device event includes a remaining power in the first moveable device falling below the status information threshold value.

12. The system of claim 10, wherein the first moveable device event includes a quality of a received signal of the first moveable device falling below the status information threshold value.

13. An article of manufacture, including a computer readable medium, comprising:
   a short-range radio software component to process a short-range radio frequency signal in a short distance wireless network;
   a notify software component to notify a status information of a first, a second and a third device in the short distance wireless network;
   a calculate software component to calculate the status information, using a bit error rate, wherein the notify software component notifies status information of the first, second and third devices such that a user identifies a physical orientation of the first, second and third devices by the first device displaying the status information of the second and third devices, for maximum signal reception.

14. A method for providing status information in a short distance wireless network, comprising:
   obtaining status information of a plurality of devices in the short distance wireless network responsive to a short-range radio frequency signal; and,
   notifying the status information responsive to a plurality of status information notify preference values,
   wherein the status information is calculated using a bit error rate and responsive to a plurality of status information type values; and displaying the status information of a first and a second device in the plurality of devices on a third device in the plurality of devices such that a user identifies a physical orientation of the first, second and third devices for maximum signal reception.

15. The method of claim 14, further comprising:

selecting the notify preference responsive to a user selection, wherein the notify preference value indicates which respective status information of a plurality of terminals in the short distance wireless network is displayed.

16. The method of claim 15, further comprising:

selecting a status information threshold value responsive to a user selection, wherein the status information threshold value indicates when the status information is displayed.

* * * * *